Dec. 23, 1958 J. F. BARNES ET AL 2,865,768
FOOD PACKAGE
Filed Dec. 29, 1954 2 Sheets-Sheet 1
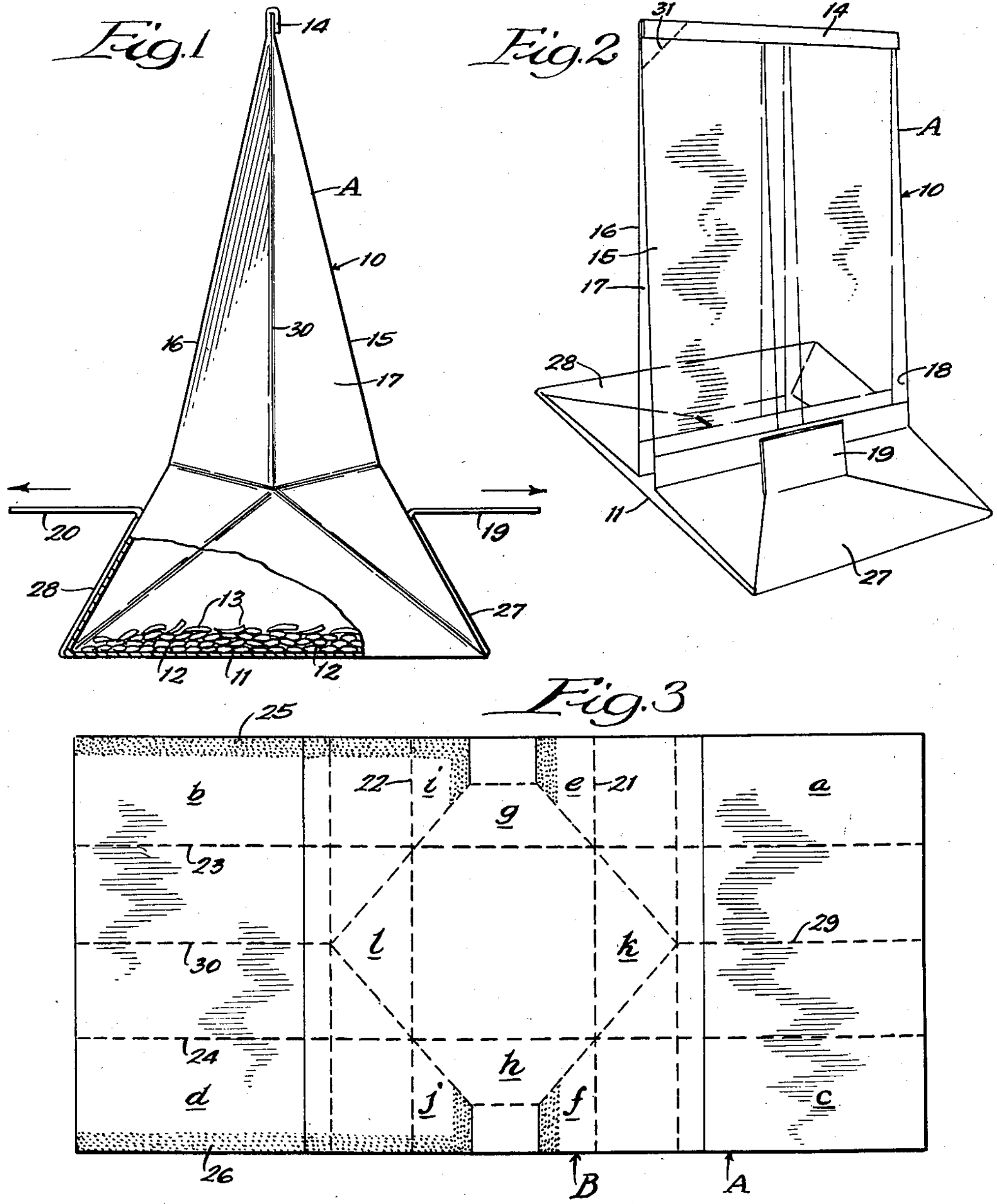
INVENTORS:
James F. Barnes and
Elmer F. Rebholz,
BY Dawson, Tilton & Graham,
ATTORNEYS.

Dec. 23, 1958 J. F. BARNES ET AL 2,865,768
FOOD PACKAGE
Filed Dec. 29, 1954 2 Sheets-Sheet 2
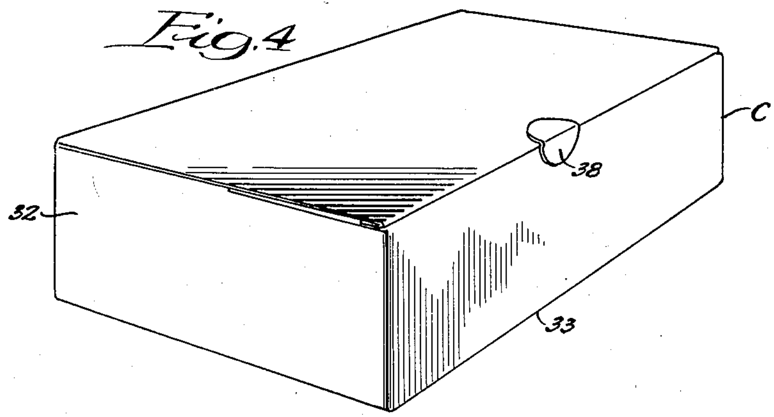
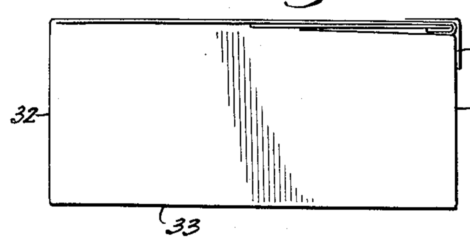
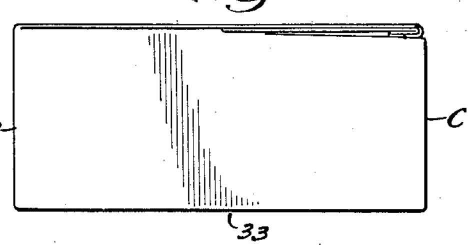
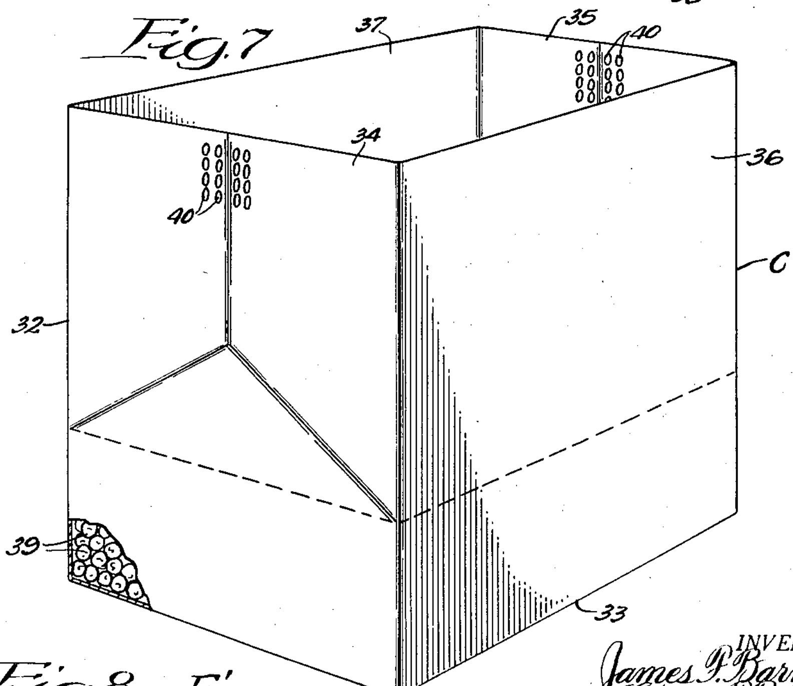
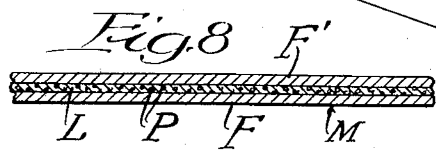
INVENTORS:
James P. Barnes and
BY Elmer F. Rebholz,
Dawson, Tilton & Graham,
ATTORNEYS.

United States Patent Office 2,865,768

Patented Dec. 23, 1958

2,865,768

FOOD PACKAGE

James F. Barnes, Van Nuys, Calif., and Elmer F. Rebholz, St. Louis, Mo., assignors to Foil Process Corporation, Van Nuys, Calif., a corporation of California Application December 29, 1954, Serial No. 478,387

7 Claims. (Cl. 99—171)

This invention relates to a food package and more particularly to a food package which is adapted for the packaging and preparation of a food product requiring heating and an enlargement in volume in the preparation thereof.

This application is a continuation-in-part of our co-pending application U. S. Serial No. 271,828, filed February 15, 1952, and now abandoned.

It has heretofore been proposed to package food products in containers formed of aluminum foil and the like so that the food product could be heated or cooked without removing it from the container. This idea, however, has not been applied to the packaging of food products, such as popcorn, which greatly increase in volume during the preparation thereof. Such food products present peculiar difficulties in connection with this type of packaging. On the one hand, it is desired to produce a package of minimum volume for commercial distribution, while on the other hand the package must provide an enlarged volume during the preparation of the product. Further, for forming the package and during the commercial distribution thereof, it is desired to have the container relatively flexible, yet this property is undesirable during the heating of the food product. Instead, it would be desirable to provide a substantially rigid container for use in the preparation of the product.

It is therefore a general object of this invention to provide a food package which is particularly adapted for the packaging and preparation of food products like popcorn which require heating and an enlargement in volume in the preparation thereof. More specifically, it is an object to provide a food package of the character described wherein the food package can be distributed commercially and also prepared without removing it from the package. Still another object in relation to the preferred form of the present invention is to provide a package for popcorn or other food product which includes a cooking container that is highly flexible during the distribution of the food product while becoming substantially rigid as the food product is heated in the container. Still another object is to provide a food package of the charcter described which is adapted for the rapid transfer of heat from the burner of a stove to the food product within the package, while at the same time providing a sturdy and liquid-tight construction. Further objects and advantages will appear as the specification proceeds.

This invention is shown in illustrative embodiments in the accompanying drawings, in which—

Fig. 1 is a side elevational view of a popcorn package embodying the present invention; Fig. 2, a perspective view of the package of Fig. 1; Fig. 3, a plan view of a cut, scored, and adhesively coated blank from which the container employed in the package of Figs. 1 and 2 can be formed; Fig. 4, a perspective view of another package structure embodying the present invention; Fig 5, an end view of the package of Fig. 4, with the closure seal intact; Fig. 6, a view similar to Fig. 5, showing the closure seal removed; Fig. 7, a perspective view of the same package after it has been opened, showing the container in expanded condition for use in preparing the food product; and Fig. 8, a fragmentary sectional view of the metal foil laminate employed to form the container used in the package of Figs. 4 to 7, and the bottom portion of the container used to form the package of Figs. 1 and 2.

The present invention is concerned with a food package which includes a container formed of flexible sheet material and constructed so that it can be selectively expanded or collapsed to provide respectively an enlarged or reduced volume therein. The contemplated container should also have a flat bottom adapted to support the container on a horizontal heating surface and at least the bottom portion of the container should be formed of a metal foil sheet material. In addition, the food package includes a food product within the container of a kind which requires heating and an enlargement in volume in the preparation thereof. Further, the food product should have a volume before its preparation not over the reduced volume of the container when in collapsed condition, and a volume during and after the preparation thereof not over the enlarged volume of the container when expanded.

A specific embodiment of the present invention is illustrated in Figs. 1 and 2 of the drawings, which show a popcorn package designated generally as A. Package A includes a sealed bag 10 of flexible sheet material having a flat bottom 11 adapted to support the body of the bag in an upright position on a horizontal heating surface. Within bag 10, as shown more clearly in Fig. 1, there is provided a plurality of unpopped grains of popcorn 12 and a plurality of flakes of cooking fat 13. The quantity of popcorn grains 12 is preferably somewhat less than the number which would completely fill bag 10 on being popped. Also, the quantity of flakes 13 of cooking fat is preferably sufficient to form a liquid layer over the inside of bottom 11 when the cooking fat is melted by the application of heat to the bottom of the bag. The top of bag 10 can be closed by any suitable means, as indicated at 14.

In the illustration given, bag 10 includes front panel 15, rear panel 16, and side panels 17 and 18. Side panels 17 and 18 are pleated as indicated in Fig. 1, and are adapted to extend inwardly when bag 10 is in collapsed condition to permit front panel 15 to lie against rear panel 16 in the manner shown in Fig. 2. For use in opening or expanding bag 10, the lower portion thereof is provided with oppositely disposed pull tabs 19 and 20, which operate as illustrated in Fig. 1.

The lower portion of bag 10 is preferably formed of a metal foil sheet material, such as an aluminum foil sheet material. While a single sheet of aluminum foil can be used, best results have been achieved with a sheet material composed of two thin sheets of aluminum foil bonded together with a heat-resistant adhesive material, such as a thermosetting resin adhesive. In order that the popping operation can be viewed, it is preferred to form the upper portion of bag 10 of a transparent plastic film, such as a cellulose film. Various other plastic films can also be used with comparable results. In the illustration given, the upper plastic film portion of bag 10 is adhesively attached to the lower aluminum foil portion of the bag.

Fig. 3 shows a cut, scored, and adhesively coated blank B of sheet material which can be used to form the container shown in the package of Figs. 1 and 2. The dotted lines indicate score lines along which the folds are made in fabricating the bag, while the solid lines indicate lines of complete severance. Some of the edges of the sheet are darkened to indicate that an adhesive has been applied thereto, such as a thermosetting resin adhesive. The bag may be formed from blank B as follows: The ends of the sheet can first be folded up along fold lines 21 and 22. The edge portions of the upwardly extended end portions are then folded inwardly along lines 23 and 24 and brought into edge-overlapping relation and glued together. For example, panel portion *a* can be brought inside of panel portion *b* and secured thereto by the adhesive 25 along the margin of panel portion *b*, while panel portion *c* can be brought inside of panel portion *d* and secured thereto by adhesive 26. In this operation, sheet portions *e* and *f* are folded respectively onto flap portions *g* and *h*, and sheet portions *i* and *j* are folded onto flap portions *g* and *h* respectively in edge-overlapping relations with sheet portions *e* and *f*, and adhesively sealed thereto. Next, flaps 27 and 28 are folded upwardly and glued respectively to the front and rear panels 15 and 16 in the manner indicated in Figs. 1 and 2. Pull tabs 19 and 20 are left free so that they can be used to assist in extending the bag after it is collapsed. At this point in the operation, a plurality of grains of unpopped popcorn 12 can be introduced through the open top of the assembled bag together with a plurality of particles of solid fat 13. The appearance of the fat particles 13 and the corn grains 12 is shown in Fig. 1. The pleated side panels 17 and 18 are then tucked inwardly along fold lines 29 and 30 and gusset portions *k* and *l* are tucked inwardly to collapse the bag, as shown in Fig. 2. The top of the bag can then be folded and closed by any suitable means, such as sealing the top of the bag with adhesive.

When it is desired to prepare the popcorn, the upper corner of container 10 can be torn off along line 31, thereby opening the interior of the container to the atmosphere and providing a vent or exhaust opening. Then by drawing pull tabs 19 and 20 apart, the container is brought to the fully open or expanded condition shown in Fig. 1. It is then ready to be placed upon a stove burner, or alternatively, on a heated surface in contact with a stove burner such as the bottom of a frying pan. The heat from the burner will melt the flakes 13 of cooking fat and form a liquid layer of cooking fat over the bottom of the bag, which layer will continue to be heated until it reaches the temperature at which the grains of corn will begin to pop. The popping of the corn will then continue until substantially all of the grains have been popped, and container 10 is nearly full of corn.

Another embodiment of the present invention is illustrated in Figs. 4 to 7 of the drawings. This embodiment is particularly adapted for the packaging of frozen foods which require cooking in the presence of added quantities of water. By way of specific example, frozen vegetables can be mentioned. The package C of Fig. 4 also includes a collapsible and expandable container 32 having a flat bottom 33 for supporting the container in an upright position.

In the embodiment shown, the upper portion of container 32 is adapted to be folded by tucking side panels 34 and 35 inwardly and bringing front panel 36 beneath rear panel 37, thereby producing a rectangular box structure as illustrated in Figs. 4 to 6. If desired, a closure seal 38 can be applied to maintain container 32 in this closed condition.

By removing seal 38, as illustrated in Fig. 6, container 32 can be opened to provide an enlarged volume, the appearance of the fully opened container being shown in Fig. 7. In the illustration given, frozen peas 39 are shown within container 32, but it will be understood that other food products could be substituted.

With the container opened as shown in Fig. 7, a quantity of water can be added to the frozen peas 39 so that the peas can be cooked within container 32. For this purpose, it is preferred that the entire container 32 be formed of a metal foil sheet material. In order that container 32 may be removed from the stove after the completion of the cooking operation, the upper edge portions of sides 34 and 35 can be provided with a plurality of perforations 40, which are grouped to provide relatively cool areas which may be grasped with the fingers.

The preferred metal foil sheet material for use in the packages just described is shown more clearly in Fig. 8 of the drawings. This sheet material M is an aluminum foil laminate composed of an outer sheet of thin aluminum foil F and a similar inner sheet of aluminum foil F′. Sheets F and F′ are adhesively bonded together with a layer L of a heat-resistant adhesive material, which is preferably a thermosetting resin adhesive. Various commercially available thermosetting resin adhesives are suitable, such as the Epon adhesives VI and VII, and the Araldite adhesives AN–101 and AN–104. These adhesives are produced by the reaction of an epoxy resin with a polyamide resin. Such thermosetting resin adhesives have very desirable properties for the specific purposes of the present invention. For example, such adhesives provide a good bond while being in a flexible resilient state, although the bond produced improves as the adhesive increases in hardness. Further, thermosetting resin adhesives tend to decrease in flexibility and increase in hardness when subjected to heat. Further, it is quite feasible to form an aluminum foil laminate of the type illustrated in Fig. 8 of the drawings which is flexible and resilient while being formed into a container and during the commercial handling of the container, which undergoes a marked increase in hardness and decrease in flexibility when the container is heated on a stove. In connection with the present invention, this has the surprising and important advantage of permitting the container to be readily collapsed to provide packages of minimum volume for distribution through the channels of commerce, while upon being opened and placed upon a stove for cooking a food product therein, the containers are transformed into a substantially rigid cooking vessel, which can be handled with comparative ease after the completion of the cooking operation.

To further improve the properties of the aluminum foil laminate, it is preferred to incorporate in the adhesive layer L a sufficient quantity of metal particles to promote the transfer of heat from outer foil layer F to inner foil layer F′. As shown in Fig. 8, these metal particles P can be flakes of aluminum which are distributed substantially uniformly throughout layer L. In practice, it has been found that the incorporation of from .4 to 1% of aluminum flakes in a thermosetting resin adhesive gives the desired result.

While in the foregoing specification this invention has been described in relation to specific embodiments thereof, it will be apparent to those skilled in the art that the invention is susceptible to other embodiments and that many of the specific details set forth herein can be varied widely without departing from the basic concepts of the invention.

We claim:

1. A combination food package and cooker, comprising a closed, collapsed container, said container being constructed and arranged so that it can be expanded to provide an enlarged volume therein, said container having a flat bottom adapted to support it on a horizontal heating surface and at least the bottom portion of said container being formed of a metal foil sheet material, said container in collapsed condition having side wall portions folded together and into generally parallel alignment with said bottom wall and being expandable by the unfolding of said side wall portions to provide said enlarged volume, and a food product within said container requiring heating and an enlargement in volume in the preparation thereof, said food product having a volume before preparation not over the reduced volume of said container when in collapsed condition and an appreciably greater volume during and after preparation but not over that of the enlarged volume of said container.

2. The combination food package and cooker of claim 1 in which at least the said bottom portion of said container is formed of an aluminum foil laminate composed of two layers of aluminum foil bonded together with a thermosetting resin adhesive.

3. A combination popcorn package and popper, comprising a closed, collapsed container, said container being constructed and arranged so that it can be expanded to provide an enlarged volume therein, said container having a flat bottom adapted to support it on a horizontal heating surface and at least the bottom portion of said container being formed of a plurality of metal foil sheets adhesively laminated together, said container in collapsed condition having side wall portions folded together and into generally parallel alignment with said bottom wall and being expandable by the unfolding of said side wall portions to provide said enlarged volume, a portion of cooking fat within said container sufficient when heated to form a layer over said bottom wall, and a quantity of unpopped shelled popcorn within said container, the said quantity of popcorn being sufficient when popped to occupy an appreciably greater volume than that of said container when in collapsed condition but not over that of the enlarged volume of said container.

4. The combination popcorn package and popper of claim 3 in which at least the said bottom portion of said container is formed of an aluminum foil laminate composed of two layers of aluminum foil bonded together with a thermosetting resin adhesive.

5. The combination popcorn package and popper of claim 3 in which there is also provided pull tab means attached to the lower portions of the outsides of said side walls and arranged so that said container can be at least partially expanded from said collapsed condition by manually drawing said pull tabs apart.

6. The combination popcorn package and popper of claim 3 in which the upper portion of said container is formed of a transparent, non-metallic sheet material.

7. A combination popcorn package and popper, comprising a closed, collapsed container, said container being constructed and arranged so that it can be expanded to provide an enlarged volume therein, said container having a flat bottom portion adapted to support it on a horizontal-heating surface, said container in collapsed condition having side wall portions folded together and into generally parallel alignment with said bottom wall and being expandable by the unfolding of said side wall portions to provide said enlarged volume, the upper portion of said container being formed of a transparent, nonmetallic sheet material and the lower portion of said container being formed of a metal foil sheet material, said metal foil sheet material being composed of two layers of aluminum foil bonded together with a thermosetting resin adhesive, a portion of cooking fat within said container sufficient when heated to form a layer over said bottom wall, a quantity of unpopped shelled popcorn within said container sufficient when popped to fill a greater volume than the reduced volume of said container but not over the enlarged volume of said container, and pull tab means attached to the lower portions of the outsides of said side walls and arranged so that said container can be at least partially expanded from said collapsed condition by manually drawing said pull tabs apart.

References Cited in the file of this patent

UNITED STATES PATENTS

| | | |
|---|---|---|
| 1,576,088 | Bunz | Mar. 9, 1926 |
| 2,480,679 | Spencer | Aug. 30, 1949 |
| 2,609,301 | Lindsey | Sept. 2, 1952 |
| 2,633,284 | Moffett et al. | Mar. 31, 1953 |
| 2,642,412 | Newey | June 16, 1953 |
| 2,673,805 | Colman | Mar. 30, 1954 |
| 2,673,806 | Colman | Mar. 30, 1954 |
| 2,702,246 | Kinsella | Feb. 15, 1955 |

OTHER REFERENCES

Food Engineering, November 1951, page 156.

"Refrigerating Engineering," February 1954, page 46.